Figures 1, 2, 3:
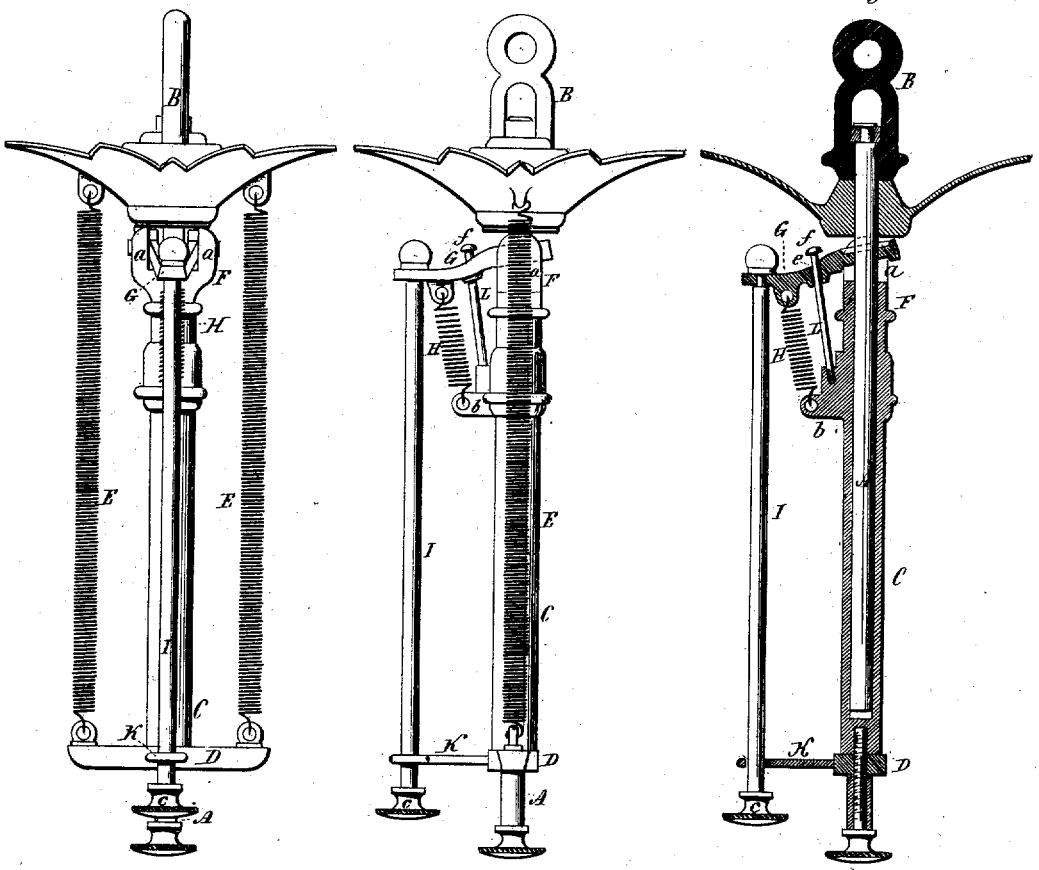

L. HULL.

Assignor by mesne assignments to Bradley and Hubbard Manufacturing Co., and the Meriden Malleable Iron Co.

EXTENSION CHANDELIERS.

No. 7,561. Reissued March 20, 1877.

Witnesses:
C. H. Chimney
Clara Broughton

Livorus Hull
Inventor,
By Atty
John E. Earle

N. PETERS, PHOTO-LITHOGRAPHER, WASHINGTON, D. C.

UNITED STATES PATENT OFFICE.

LIVERUS HULL, OF CHARLESTOWN, MASSACHUSETTS, ASSIGNOR, BY MESNE ASSIGNMENTS, TO BRADLEY AND HUBBARD MANUFACTURING COMPANY AND THE MERIDEN MALLEABLE IRON COMPANY, OF WEST MERIDEN, CONNECTICUT.

IMPROVEMENT IN EXTENSION-CHANDELIERS.

Specification forming part of Letters Patent No. 142,107, dated August 26, 1873; reissue No. 7,561, dated March 20, 1877; application filed December 6, 1876.

*To all whom it may concern:*

Be it known that I, LIVERUS HULL, of Charlestown, in the county of Middlesex and State of Massachusetts, have invented a new Improvement in Extension-Chandeliers; and I do hereby declare the following, when taken in connection with the accompanying drawings and the letters of reference marked thereon, to be a full, clear, and exact description of the same, and which said drawings constitute part of this specification, and represent, in—

Figure 1 a front elevation; Fig. 2, a side view; and in Fig. 3, a vertical section.

This invention relates to an improvement in that class of fixtures which are constructed so as to adjust the burners or light to different elevations commonly termed "extension-fixtures;" and the invention consists in the combination of mechanism, as hereinafter described, and more specifically recited in the claims.

The central portion of the fixture is composed of two parts—a central rod, A, attached to a hanger, B, whereby the said rod becomes the stationary part. The other part C is of tubular form, arranged to slide freely on the said rod. At the lower end of this tube the burner or arms are attached.

The said tube is provided with a cross head or bar, D, which, near its end, is connected with the hanger by counterbalancing helical springs.

The said tube is also provided with a clamping device for engaging it with the stationary part, so as to hold the burner at any desired elevation to which the adjustable part may be set upon the stationary part. This clamping device, as here represented, consists of a tubular and furcated head, F, between the prongs *a a* of which a lever-brake, G, is arranged, it being also pivoted to the said prongs. The rod A extends through the lever-brake in manner as represented. A helical spring, H, fixed to the brake, and an ear, *b*, extending from the head F, serves to draw downward the lever-brake, so as to cause it to gripe or bind upon the rod.

A stiff rod, I, is applied to the lever-brake, which extends down and loosely through a guide-arm, K, projecting from the cross-bar D, and provided with a knob, *c*, on its lower end.

By applying the hand to the knob and pressing it upward the force of the clamp may be overcome, so as to relieve from its gripe the stationary part A, in order to permit the adjustable part C to be moved either upward or downward.

In order to prevent the lever-brake, while being elevated, from going too high, so as to operate to stop or hinder the movement of the tube C, there is fixed to the head, F, a check, L, which is a rod passing through a slot, *e*, in the lever-brake, and provided with a head, *f*.

The brake-spring is fastened to the head F, and is in constant tension, the brake being relieved of such only by upward pressure exerted through the rod I.

I claim—

1. In an extension-chandelier the combination of the following elements, viz., first, a vertical central shaft or support composed of two parts—one within the other, and telescopically movable, so as to extend or contract said shaft, one of the said parts stationary, the burner-arms attached to the other; second, a clamping device to engage said two parts with each other to support the movable part at various elevations, and by an upward action on said clamping device; third, a rod in connection with said clamping device, and extending down as a means for imparting such upward action to said clamping device, substantially as described.

2. The elevator I and spring H, combined and arranged with the lever-brake G and head F or upper part of the slide-tube C, said tube being applied to the rod A and supported by springs E, substantially as represented.

3. The check L, lever-brake G, spring H, and the elevator I, arranged and combind together, and with the rod A, the slide-tube C, and the springs E, all substantially as and to operate as explained.

LIVERUS HULL.

Witnesses:

THO. J. FISHER,

ALONZO H. BRIGGS.